United States Patent

[11] 3,631,395

[72] Inventor Fredric E. Zucker
 Stamford, Conn.
[21] Appl. No. 58,242
[22] Filed July 27, 1970
[45] Patented Dec. 28, 1971
[73] Assignee Pitney-Bowes, Inc.
 Stamford, Conn.

[54] DATA COMMUNICATION AND VERIFICATION SYSTEM
 7 Claims, 5 Drawing Figs.

[52] U.S. Cl. .................................................. 340/149 A,
 179/2 CA
[51] Int. Cl. ....................................................... H04q 9/00
[50] Field of Search ........................................... 340/149,
 152, 147 T; 179/2 DP, 2 R, 2 CA

[56] References Cited
 UNITED STATES PATENTS
 1,055,929 3/1913 Long ........................ 340/147 MD UX
 3,094,682 6/1963 Brosh et al. ..................... 340/147 X
 3,121,159 2/1964 Rogal ............................. 235/61.6
 3,189,874 6/1965 Miller et al. ..................... 340/147
 3,394,246 7/1968 Goldman ......................... 340/149 A
 3,530,341 9/1970 Hutchinson ..................... 317/137 UX Primary Examiner—Donald J. Yusko
Attorneys—William D. Soltow, Jr., Albert W. Scribner, Martin D. Wittstein and Louis A. Tirelli ABSTRACT: A system for communicating more than 100 different digital message combinations over a single voice-grade telephone link, using different combinations of only two frequency tones. The invention is particularly useful in a credit card verification system comprising a satellite station where the card is identified, a communications link over which card identification information is transmitted, and a computer station which sends back an answer in the form of frequency tones uniquely specifying one of four verification possibilities. If the credit card is acceptable, it also provides a number in the range from 00 to 99 which identifies the particular transaction for subsequent audit purposes.

INVENTOR.
FREDRIC E. ZUCKER
BY Albert W. Scribner
ATTORNEY

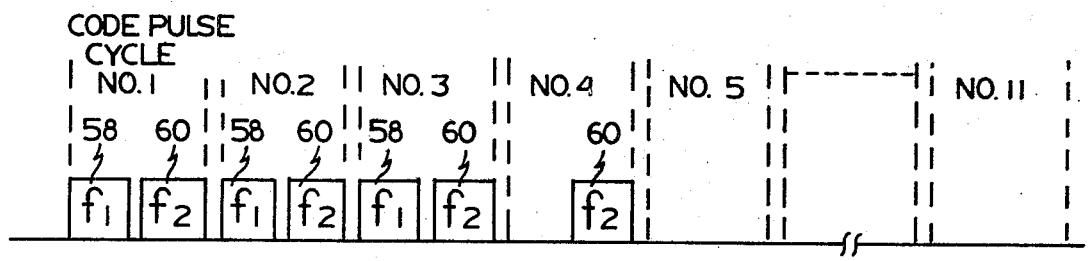
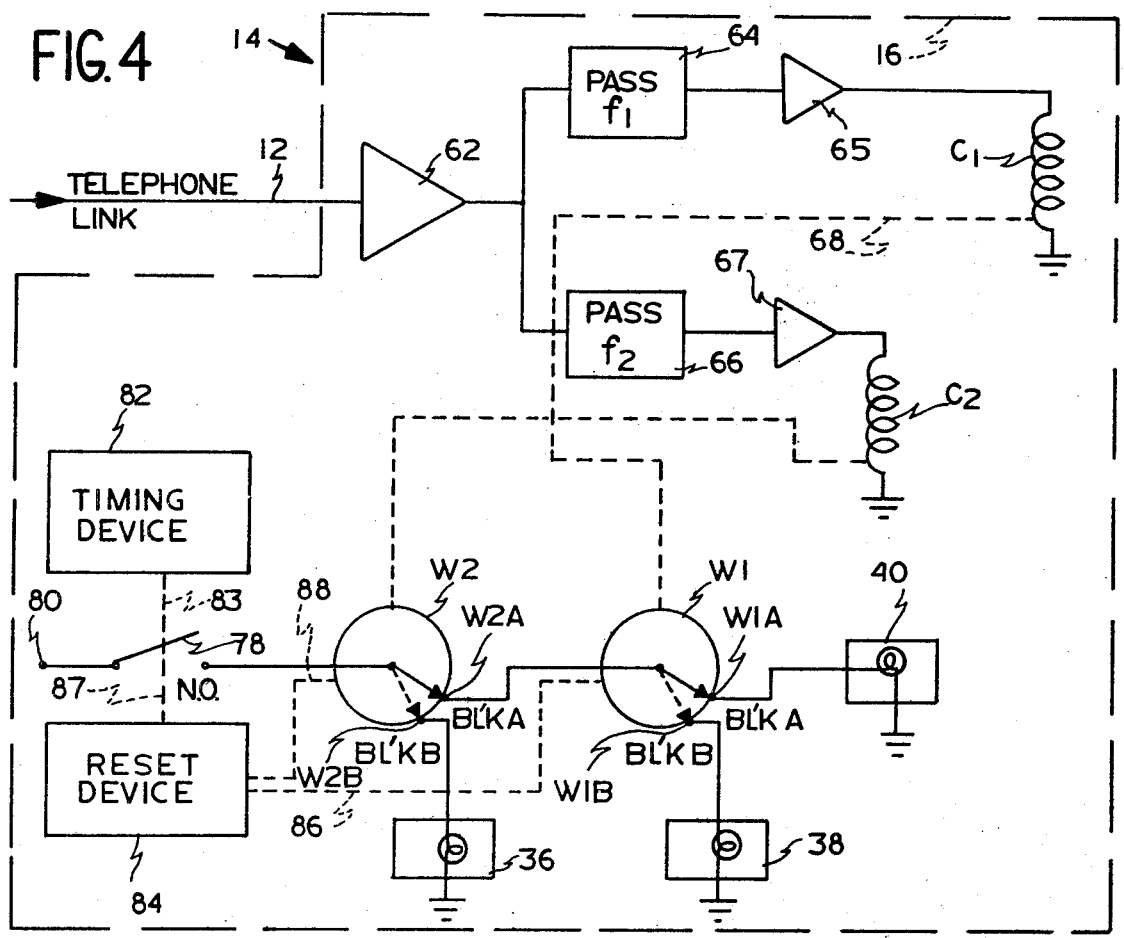

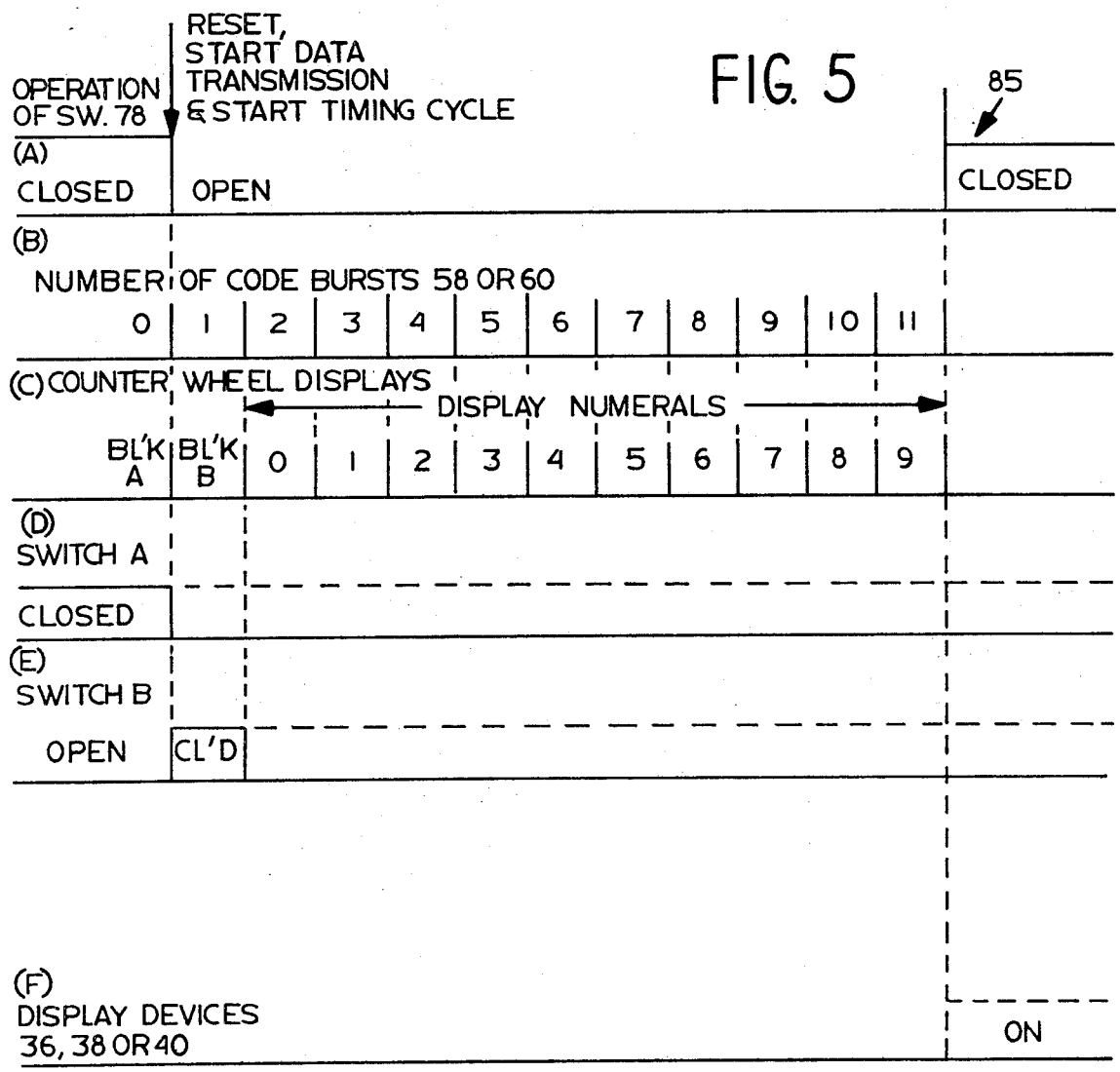

DATA COMMUNICATION AND VERIFICATION SYSTEM

FIELD OF THE INVENTION

This invention relates generally to data communicating, and particularly to the use of frequency tones to convey information over telephone lines. It also relates to an economical answer-back technique for use in a credit card verification system.

THE PRIOR ART

Wallet-sized plastic credit cards have become an important medium of exchange in the economy of this country. But such cards are subject to various types of abuse, such as the use of outdated, canceled, lost, stolen, altered, or otherwise unauthorized cards. One way of dealing with this problem is to install, at the retail stations or other places where credit cards are presented, automatic credit card verifiers which read an identifying number printed in coded form on each credit card, and relay it, preferably over conventional telephone lines, to a computer located at a central station. The computer then checks the status of the card and provides a rapid response, indicating whether it is or is not acceptable.

For maximum utility, the credit card verification device located at the sales location should receive back from the computer a reply which can take one of the following four alternative forms: (1) If the credit card is unacceptable for any reason, the computer should send back a message which prohibits the sale. (2) If the credit card is acceptable without qualification, the computer should send back a message which permits the sale to be consummated. (3) If approval depends upon further information, the computer should send back a message which instructs the sales clerk to call a special telephone number. (4) when appropriate, the computer should ask the sales clerk to retransmit the credit card identification information.

In addition, under alternative (2) above, (sale allowed to proceed without qualification), the computer should send back a number which identifies that particular transaction on the computer records, thus preparing the basis for a subsequent audit if it should later prove necessary. The transaction number is preferably randomly selected from as many as 100 numbers, so that there is a low probability that a dishonest sales clerk will be able to guess the next number without entering the transaction into the computer memory.

The four different answer-back conditions described above, one of which requires a hundred different transaction numbers, represent a total of 103 different data combinations to be sent over ordinary voice-grade telephone lines. Prior art systems for accomplishing this entail considerable expense, particularly so far as the point-of-sale device is concerned. Costly electronic equipment is somewhat more tolerable at the central computer station since it is not duplicated; but the point-of-sale device must be duplicated for each retail establishment, or perhaps even each department in a large store. Therefore, as much hardware as possible must be excluded, to keep the cost to the subscriber low, and thus permit widespread marketing of such equipment.

All the information exchanged between the verifying station and the central computer station must be capable of transmission over ordinary voice-grade telephone lines, in order to keep the communications cost down and make the system practical. It is highly desirable, therefore, that all messages be coded in the form of combinations of frequency tones, since messages in this form are less vulnerable to noise and degradation. In addition, much of the telephone equipment in this country is now designed specifically for the transmission of numerical data in this form, as for example witness the latest in telephone "dialing" equipment which employs various combinations of two frequency tones to represent telephone call numbers (e.g., Bell Telephone Touch-tone code).

The requirements just stated are to some degree antagonistic. The simpler the form which the computer answer-back messages are required to take (eg. combinations of only two tones), the more sophisticated the equipment at the point of sale would ordinarily have to be, in order to decode 103 possibilities. Conversely, if the amount of decoding hardware which can be included in the verifying terminal is limited, sophisticated and elaborate message forms would ordinarily be required to represent so many different message combinations in such a manner that inexpensive terminal equipment would be able to handle it.

THE INVENTION

The present invention, despite the severe and antagonistic nature of these requirements, provides a data communication system in which various combinations of only two different frequency tones are able to encode more than a hundred different messages. For the specific purpose of a credit card verification response, these would embrace the four message categories and 100 different transaction numbers described above.

Frequency coding is the preferred approach for telephone transmissions where all message components must share a common electrical path, and cost limitations prevent the receiving terminal equipment from being sophisticated enough to distinguish messages on the basis of time, i.e., by any of the conventional pulse modulation techniques based on pulse position or duration. If transmission is by special cable having at least two different electrical pathways, however, then signals can be distinguished on the basis on conduction path rather than frequency, and the frequency coding aspect of the invention could be dispensed with.

In either case the invention contemplates means for generating at least first and second pulses, e.g., frequency bursts, which are distinguishable from each other on the basis of frequency or on some other basis, and means for transmitting a selected number of first pulses and a selected number of second pulses. At the receiving terminal there are individual counting means which count the first and second pulses respectively, and one or more means which are responsive to the coincidence of various particular pairs of count conditions of these two counters to display various particular messages.

In the specific context of a frequency-coded credit card verification system, if the central computer sends back no pulses of a first frequency $f1$ and no pulses of a second frequency $f2$, that may mean there has been an incomplete transmission. If there is one pulse of frequency $f1$ but no pulse of frequency $f2$, that may mean "Do not sell." If there is one pulse of frequency $f2$ and no pulse of frequency $f1$, that may constitute a direction to call a special number for additional information. In addition, various combinations of from 2 to 11 pulses of one frequency with from 2 to 11 pulses of the other frequency, a total of 100 combination, may respectively represent the 100 different numbers by which the computer identifies a particular transaction for which use of a credit card is authorized.

BRIEF DESCRIPTION OF THE DRAWINGS

FIG. 3 is a pulse-timing diagram illustrating the operation of the central station in FIG. 1.

FIG. 4 is a functional block and schematic circuit diagram of the circuitry located at the verifying station in FIG. 1.

And FIG. 5 is a timing diagram illustrating the operation of the circuit of FIG. 4.

The same reference numerals refer to the same elements throughout the several views of the drawing.

DETAILED DESCRIPTION OF THE PREFERRED EMBODIMENT

Figure 1:
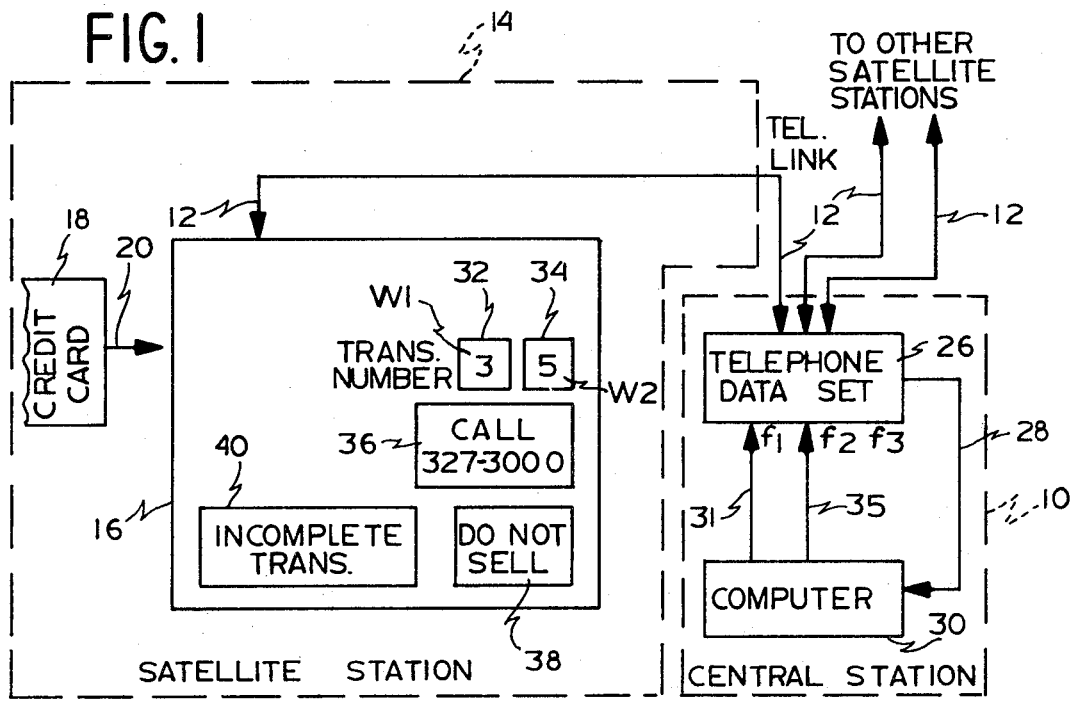
FIG. 1 is an overall functional block diagram of a credit card verification system employing this invention.

A credit card verification system of the type illustrated in FIG. 1 comprises a central computer station 10 connected by some type of communications link, such as ordinary voice-grade telephone lines 12, to a plurality of credit card verifying satellite stations 14 (only one of which is illustrated). These stations 14 are at various remote locations where credit cards are used as a medium of exchange, e.g., retail sales locations. At each such location, there is a piece of terminal equipment such as a verifier device 16 into which a credit card 18 is inserted, as indicated by arrow 20. The card 18 is provided with an identification number recorded thereon in some machine-readable format, such as embossed characters or bars, magnetic or luminescent spot code, etc. The verifier 16 is equipped with suitable automatic reading means of the magnetic, photoelectric, or other appropriate type, which senses the identification number recorded on the credit card 18, and transmits it, in any appropriate electronically coded signal format, over the communications link 12 leading to a data set 26. The latter may be located at the central computer station 10, as shown; or it may be at some other location along the communications link 12. That data set relays the information over line 28 to a computer 30, which services the credit card verification operations at all of the satellite stations 14, either on a time-sharing or queuing basis.

Upon receiving a request for credit card verification service from one of the satellite stations 14, the computer 30 checks the received credit card identifying number against a list of the identifying numbers of all unacceptable credit cards, which information has previously been stored in the computer's memory. If the verifier 16 is of the type which also transmits information as to the amount of the proposed sale, the computer 30 checks additional information stored in its memory as to the status of the subscriber's account, to determine whether this particular sale would exceed the authorized limit. In any case, the computer issues an answer via lines 31 and 35, data set 26, and telephone link 12.

The answer falls into one of four categories. If there is no reason to prohibit the proposed credit card sale, the only information sent from the computer 30 to the verifier device 16 is a transaction number which the verifier displays in a pair of windows 32 and 34. The numeral visible through window 32 represents the tens digit, and the numeral visible through the window 34 representing the units digit, of a number in the range from 00 to 99.

But if the computer finds that unqualified approval cannot be given to the proposed sale, it may send back to the verifier 16 a signal which illuminates a display device 36 conveying a message such as "Call 327–3000." The particular telephone number, of course, would be one which is specially provided in that locality for the retail sales clerk to call for further information relating to the credit card subscriber's account. If the sale should not be approved under any circumstances, then the message from the computer 30 to the verifier 16 turns on a display device 38 conveying the message "Do not sell." Finally, if for any reason the computer 30 has not obtained enough information to make a decision, the reply to the verifier 16 turns on still another display device 40 conveying the message "Incomplete transmission."

In accordance with this invention, each such reply from the computer 30 to the verifier 16 comprises a coded combination of pulses. Each pulse preferably consists of an audiofrequency tone burst which can be transmitted over an ordinary voice-grade telephone line 12 with relatively little signal degradation and a high degree of noise immunity.

The audiofrequency tones can be generated by specially designed, but conventional, audio oscillators. Preferably, however, the data set 26 can provide the audio tones. This circuit is a conventional device, supplied by the local telephone utility, which serves two functions in the system of FIG. 1. For credit card identification and sale amount data transmitted by verifier 16 over line 12 and encoded in telephone frequency tone form (e.g., Bell System's Touch-tone code), the data set 26 serves as a decoder. In addition, conventional data sets of this type, e.g., Bell System's Model 403E, contain three tone generators for respective frequencies $f1$, $f2$, and $f3$, all in the audio range. The circuit 26 has three separate input terminals labeled $f1$, $f2$, and $f3$, indicating that a signal applied to one of those terminals causes the circuit 26 to generate a burst of the corresponding frequency tone, and to transmit it as an output over line 12 to verifier 16. In this particular embodiment, only frequencies $f1$ and $f2$ are used, and the corresponding terminals are energized by the computer 30 over lines 31 and 35 respectively.

While a system employing a greater number of frequency tones could be used in a system of this type, it is one of the advantages of the invention that the entire range of credit card verification replies, including 100 different transaction numbers, can be encoded with combinations of only two frequency tones, resulting in simplification and economy of circuit design.

The computer 30 is preferably a conventional general purpose stored-program digital device of the type now in common use. It provides the credit card verification replies in the form of pulsed signals on the leads 31 and 35 leading to the $f1$ and $f2$ frequency-selecting input terminals respectively of the data set 26. It is the respective numbers of these computer-generated frequency-selecting pulses which encode the credit card verification reply. Lines 31 and 35, each time they are pulsed, cause a burst of frequency tone $f1$ and $f2$ respectively to emerge from telephone data set 26 and be transmitted over the telephone link 12 to the satellite station 14.

As seen in FIG. 3, the computer 30 strobes each line 31 and 35 either for one pulse time or none, during each code pulse cycle; and there are 11 such cycles for each credit card verification operation. As an example, in each of the first three code pulse cycles, the computer may strobe line 31 once and line 35 once. But the computer is also able to omit a pulse on one or both of the leads 31 and 35 in any cycle. In cycle No. 4, for example, the pulse on line 31 is omitted, but not the pulse on line 35. Alternatively, the computer could omit the pulse on line 35 but not the pulse on line 31. Or, as in cycles Nos. 5 and 11, both pulses could be omitted.

The waveform in FIG. 3 is the pulsed frequency burst output from data set 26 appearing on line 12. For each pulse on line 31 there is an output 58 comprising a burst of frequency $f1$, and for every pulse on line 35 there is an output 60 comprising a burst of frequency $f2$. In those cycles where one of the pulses of line 31 or 35 is missing, there is only a single burst 60 or 58 of frequency $f2$ or $f1$ respectively; as for example in cycle No. 4. Finally, where both pulses are missing, as in cycles Nos. 5 and 11, the output waveform lacks both bursts 58 and 60 of frequencies $f1$ and $f2$.

Tone bursts 58 and 60 are transmitted over the telephone line 12, and received by the verifier 16 at satellite station 14. There, as seen in FIG. 4, a preamplifier 62 boosts the incoming signal and sends it on a pair of band-pass circuits 64 and 66 which pass frequencies $f1$ and $f2$ respectively. These circuits may be any type of conventional frequency-discriminating device performing a band-pass function; such as resonant, active, digital, or Fourier filters, or the equivalent, together with any necessary ancillary circuits such as amplitude limiters, etc. The output of the $f1$ filter 64 goes to an amplifier 65 and a first counter drive solenoid C1, while the output of the $f2$ filter 66 goes to another amplifier 67 and counter drive solenoid C2.

Both counters are conventional electromechanical devices of the type manufactured by Veeder-Root, Presin, etc. Each comprises its respective solenoid C1 and C2, number wheels W1 and respectively, and conventional mechanisms (not shown) for incrementally stepping the number wheels. Starting from respective "home" positions, wheels W1 and W2 are advanced one increment for each frequency burst 58 or 60 applied to the associated solenoid C1 or C2 respectively. The operating connection between solenoid C1 and its associated counter wheel W1 is schematically represented by a dashed line 68, and that between solenoid C2 and its associated counter wheel W2 by another dashed line 70.

Figure 2:
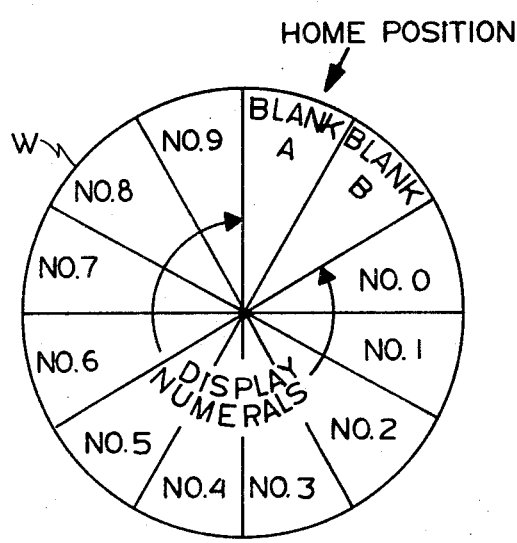
FIG. 2 is a diagram illustrating the angular distribution of visual display numerals, blank visual display positions, and switch-actuating positions with respect to electromechanical counter wheels employed in the system of FIG. 1.

FIG. 2 in an angular position diagram of a counter wheel W which exemplifies both wheels W1 and W2 of FIG. 4. Each such wheel is divided into at least 12 equal arcuate segments extending around its periphery, each segment corresponding to one increment of advance in response to the associated solenoid C1 or C2. Ten consecutive segments (designated No. 0 through No. 9) have corresponding display numerals "0" through "9" respectively printed thereon for use in generating the transaction number display at windows 32 and 34 of verifier 16. The relative positions of these windows is such that if one of the numerals of wheel W1 is visible through window 32, it represents the tens digit of the transaction number; and if one of the numerals of counter wheel W2 is visible through window 34, it represents the units digit of the transaction number. In addition, there are two other angular positions on each wheel W preceding the numeral positions. These are labeled "blank A" and "blank B" respectively; the term "blank" referring to the fact that there is no numeral or other character printed at either of these angular positions on the wheels W. Whenever one of those positions is visible through the display windows 32 or 34, the observer sees only a blank counter wheel surface conveying no information. The blank A position of each counter wheel W is the "home" position of that counter wheel.

The blank positions of wheels W1 and W2 perform the function of closing switches W1A through W2B in FIG. 4. These switches may be of any type responsive to wheels W1 and W2, but are preferably printed circuit commutators which are integrally mounted on the counter wheels and close in synchronism with the display of blanks A and B thereof according to a specific pattern. Such switches are readily in electromechanical counters of the type mentioned above.

Switches W1A and W2A are closed only when their respective counter wheels W1 and W2 display respective blanks A through respective windows 32 and 34. Switches W1B and W2B are closed only when the respective blank B positions of their respective counter wheels W1 and W2 are visible through respective display windows 32 and 34. A delay switch 78 is open through the entire 11 code pulse cycles of computer 30, and only closes thereafter during a display interval 85 (FIG. 5).

Switches 78, W2A and W1A are in series with an electric light which illuminates the "Incomplete transmission" display device 40 of credit card verifier 16; switches 78, W2A, and W1B are in series with an electric light which illuminates the "Do not sell" display device 38 thereof; and switches 78 and W2B are in series with an electric light which illuminates the display device 36 to advise calling a special telephone number for further information. Switches W1A and W1B are in parallel with each other, as are switches W2A and W2B. A power terminal 80 is provided for energizing each of the display devices.

A series connection performs a Boolean AND function. Each groups of two or three switches 78 and W1A through W2B connected in series with one of the display devices therefore constitutes a coincidence detection device, in the sense that the display device will not be illuminated unless all of its series switches close simultaneously. Clearly, in another embodiment of the invention the same AND function could be achieved using coincidence gates, flip-flops, and similar conventional digital circuits.

The operation of the circuit in FIG. 4 is illustrated by the timing diagram of FIG. 5. FIG. 5C shows that both counter wheels W start off in their home positions (blank A, switch A). Thus, as indicated in FIG. 5D, switches W2A and W1A are both closed initially, while switches W2B and W1B are open. When a data transmission arrives from the computer 30 over the telephone link 12, one or both of the counter wheels W1 and W2 may be stepped through any number of increments ranging from zero to 11, during the 11-code pulse cycles illustrated in FIG. 3. A timing device 82 in the verifier 16, which may be of any conventional type, times out an interval slightly greater than 11-code pulse cycles and then closes the normally open delay switch 78 (as indicated by dashed line 83) to turn on one of the display devices 36, 38, or 40 during display interval 85, if its respective message is appropriate. This display remains on until it is time for verification of the next credit card, when a reset device 84, which may be manually operable or may operate automatically in response to the insertion of the credit card 18 into the verifier 16, reopens switch 78 (as indicated by dashed line 87) and also resets counter wheels W1 and W2 from any current position to their home positions (as indicated by dashed lines 86 and 88 respectively). Circuits for resetting electromechanical counters in this manner are entirely conventional.

Which display device 36, 38, or 40 is illuminated during interval 85, or if none of them are illuminated, which transaction number is displayed through the windows 32 and 34, depends on how many bursts 58 of frequency $f1$ and how many bursts 60 of frequency $f2$ are transmitted during the 11-code pulse cycles illustrated in FIG. 3. The number of bursts 58 of frequency $f1$ which the computer 30 sends is entirely independent of the number of bursts 60 of frequency $f2$, so that the angular positions to which the respective counter wheels W1 and W2 are ultimately driven, for numerical display or switch closing purposes, are selected independently.

The number of bursts of each frequency $f1$ and $f2$ which the computer 30 can transmit during one credit card verification operation is in the range from 0 through 11, as illustrated in FIG. 5B. If zero bursts 58 and zero bursts 60 are transmitted during the entire 11 cycles, then counter wheels W1 and W2 remain in their blank A positions, and switches W1A and W2A both remain closed. Consequently, during the display interval 85, when delay switch 78 is closed (FIG. 5A), the switching conditions of display device 40, but not display devices 38 or 36, will be satisfied, and only the message "Incomplete transmission" will be illuminated. No numerical information will be displayed through the transaction number windows 32 and 34, since only blanks A of the counter wheels W1 and W2 will be visible therethrough. The use of the zero-zero pulse combination to indicate an incomplete transmission is a fail-safe feature, since a zero-zero "reply" will appear to have been received even if for some reason there is no computer reply at all; and under those circumstances the user will make the appropriate response of retransmitting his inquiry.

But if one burst 58 of frequency $f1$ and no bursts 60 of frequency $f2$ are transmitted during the 11-code pulse cycles, the result will be different so far as the illuminated displays are concerned. Counter wheel W1 will advance one step to blank B, opening switch W1A and closing switch W1B. Counter wheel W2 will remain in the blank A position described in the previous paragraph, so that switch W2A remains closed. During the display interval 85, therefore, when switch 78 is closed, the display device 40 will not be illuminated, but display device 38 will be. Therefore, the message "Do not sell" lights up.

Display device 36, however, is not illuminated because switch W2B remains open. And there is still no transaction number displayed through windows 32 and 34, because counter wheels W1 and W2 are displaying blanks B and A respectively.

If only counter wheel W2 is advanced one increment, however, by one burst 60 of frequency $f2$ during the 11-code pulse cycles, then switch W2B is closed and display device 36 only is illuminated during display interval 85. Thus the message "Call 327-3000" is illuminated for the benefit of the sales clerk, but no other message is illuminated. Still no transaction number is displayed through the windows 32 and 34, however, because the counter wheels W1 and W2 are in their respective blank A and blank B positions. The same result is achieved if one $f1$ burst 58 and one $f2$ burst 60 are transmitted during the 11-code pulse cycles, except that wheel W1 then displays blank B.

If two bursts 58 of frequency $f1$ and two bursts 60 of frequency $f2$ are transmitted during the 11-code pulse cycles, then counter wheels W1 and W2 advance to the positions for displaying their respective numerals "0" through the units digit window 34 and tens digit window 36 respectively. In addition, switch W2B is reopened, so that display device 36 is not turned on during display interval 85. Additional bursts 60 of frequency $f2$ will advance the units digit counter wheel W2 to display the succeeding digits "1" through "9" respectively, permitting the display of any transaction number from 00 to 09; and additional bursts 58 of frequency $f1$ will advance the tens digit counter wheel W1 to display digits "1" through "9" respectively, permitting the display of any transaction number from 00 through 99. During the display of any number from 00 to 99 none of the display devices 36, 38, or 40 are illuminated because switches W1A through W2B are open. These conditions correspond to approval of the credit card transaction, and assignment of the particular number displayed to identify that transaction.

Thus, as illustrated in FIG. 5D, switches W1A and W1B are always closed at the start of a data transmission, i.e., prior to the receipt of any code pulses. They may or may not remain closed through the 11-code pulse cycles, depending upon the number of bursts 58 and 60 respectively which are transmitted by the computer 30. If no bursts of either frequency are received, switches W1A and W2A remain closed at the conclusion of code pulse cycle number 11; and then during interval 85, when the switch 78 is also closed, the display device 40 is illuminated through the series-connected switches.

FIG. 5E shows the switches W1B and W2B are initially open at the start of the data transmission, and can be closed by the receipt of one burst 58 or 60 respectively. If only switch W1A is closed, then display device 38 is illuminated through a series switch path electrically paralleling device 40. If switch W2B is closed, then (regardless of the condition of switches W1A and W1B) display device 36 is illuminated through a path which electrically parallels devices 38 and 40.

Since all three of these conditions correspond to something less than unqualified approval of the credit sale, no transaction identification number is displayed by counter wheels W1 and W2 through the windows 32 and 34. If the counter wheels W1 and W2 are each stepped through two or more increments, however, then none of the display devices 36, 38, or 40 will be illuminated. Instead the credit sale will be approved, and a transaction number from 00 to 99 will be displayed through windows 32 and 34.

It is well within the contemplation of this invention that wheels W1 and W2 may be type wheels for printing the numerical information. Accordingly they may be referred to as "readout" means, a term intended to comprehend both printing and direct visual display.

It will now be appreciated that the present invention presents one of three different types of credit card sale disapproval messages by means of illuminated display devices, plus a fourth message category unqualified approval of a credit sale, accompanied by readout of one of 100 different credit card sale transaction identification numbers. Thus, 103 different message combinations may be received, all composed of only two different frequency tone bursts in varying numbers. This reduces the amount and complexity of hardware required at both the sending and receiving ends of the telephone link, keeping the cost of equipment, particularly receiving equipment, low enough to satisfy volume marketing requirements. In addition, the use of a small number of frequency tones has advantages in a telephone transmission environment, using voice-grade lines which are subject to noise and signal degradation.

Since the foregoing description and drawing are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. Message-receiving apparatus comprising:
   first, second, and third electrically actuated readout devices connected in series circuit with first, second, and third switch contacts respectively;
   first and second switching means each having a home position;
   a fourth switch contact operable in response to said second switching means and electrically connected to said first switching means;
   a power line connected to said second switching means;
   said first switching means being arranged to connect to said first switch contact and said second switching means being arranged to connect to said fourth switch contact whereby to connect only said first readout device to said powerline when both said switching means are in their respective home positions;
   said first switching means having an advanced position wherein it disconnects from said first switch contact and connects to said second switch contact whereby to connect only said second readout device to said powerline;
   said second switching means having an advanced position wherein it disconnects from said fourth switch contact and connects to said third switch contact whereby to connect only said third readout device to said power line;
   and means for advancing said switching means.

2. Apparatus as in claim 1 wherein said advancing means comprise first and second electrical pulse counter means arranged to advance said first and second switching means respectively in response to electrical pulses received by said counters.

3. The apparatus of claim 2 further comprising:
   first and second numerical readout devices adapted to read out first and second digits respectively, which advance in value in response to said first and second counter means respectively;
   said numerical readout devices being arranged to read out said first and second digits in juxtaposition to represent respective different order digits of a multidigit number;
   whereby the specific numerical information generated by said readout means depends upon the count conditions of both said counter means.

4. The apparatus of claim 2 further comprising:
   numerical readout devices comprising respective first and second number wheels with numerical readout digits at different positions thereon;
   and said first and second counter means drive said first and second number wheels through discrete numerical steps in response to said pulses whereby to advance said switching means from said home and advanced positions and in order to select the digits read out;
   and said first and second number wheels comprise numberless locations correlated with said home and advanced positions of said first and second switching means whereby said numerical readout commences after actuation of said electrical readout devices.

5. Apparatus as in claim 2 further comprising:
   common means for receiving distinguishable first and second pulses;
   and means for distinguishing and distributing said first and second pulses to said first and second counters respectively.

6. The apparatus of claim 5 further comprising:
   a delay switch in series with said switching means and said readout devices;
   and means for keeping said delay switch open during transmission of said pulses, and closing said delay switch thereafter.

7. Apparatus as in claim 6 wherein:
   each of said counters has a maximum count capacity of N;
   and the period of said delay means is at least the transmission time of N first pulses and N second pulses.

* * * * *